(12) United States Patent
Borschert et al.

(10) Patent No.: US 7,591,617 B2
(45) Date of Patent: Sep. 22, 2009

(54) TWIST DRILL WITH A REPLACEABLE CUTTING INSERT AND A ROTARY CUTTING TOOL WITH A REPLACEABLE CUTTING INSERT

(75) Inventors: Bernhard Borschert, Bamberg (DE); Dieter Muhlfriedel, Ebermannstadt (DE)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 12/001,246

(22) Filed: Dec. 11, 2007

(65) Prior Publication Data
US 2008/0181741 A1    Jul. 31, 2008

Related U.S. Application Data

(63) Continuation of application No. 11/438,971, filed on May 23, 2006, now Pat. No. 7,306,410, which is a continuation of application No. 10/377,588, which is a continuation-in-part of application No. PCT/EP01/09916, filed on Aug. 29, 2001, now Pat. No. 7,048,480.

(30) Foreign Application Priority Data
Sep. 1, 2000    (DE) ............................... 100 42 990

(51) Int. Cl.
*B23B 51/02* (2006.01)

(52) U.S. Cl. ..................... 408/226; 408/231; 408/713

(58) Field of Classification Search ................ 408/144, 408/226, 227, 230, 231–233, 713; B23B 51/00, B23B 51/02
See application file for complete search history.

(56) References Cited

U.S. PATENT DOCUMENTS

| | | | | |
|---|---|---|---|---|
| 2,153,236 | A  * | 4/1939 | Christman | 407/33 |
| 5,988,953 | A  * | 11/1999 | Berglund et al. | 408/1 R |
| 6,012,881 | A  * | 1/2000 | Scheer | 408/227 |
| 6,109,841 | A  * | 8/2000 | Johne | 408/144 |
| 6,506,003 | B1 * | 1/2003 | Erickson | 408/226 |
| 7,048,480 | B2 * | 5/2006 | Borschert et al. | 408/144 |
| 7,306,410 | B2 * | 12/2007 | Borschert et al. | 408/144 |

FOREIGN PATENT DOCUMENTS

WO    WO 9810881 A1 *    3/1998

* cited by examiner

*Primary Examiner*—Daniel W Howell
(74) *Attorney, Agent, or Firm*—Larry R. Meenan

(57) ABSTRACT

A twist drill or rotary cutting device, in particular a drill, comprising a tool head or cutting insert consisting of a hard cutting material and a tool shaft which clamps the tool head between two clamp extensions that project axially from said tool shaft in such a way that the tool head is interchangeable. In the fixed position, the interconnected clamping surfaces of the tool head and the clamping extensions of the tool shaft lie on the surface of a truncated cone shaped fixing peg running coaxially with the longitudinal axis of the tool shaft. The fixing peg tapers in the insertion direction, facing the chuck end of the tool shaft.

12 Claims, 6 Drawing Sheets

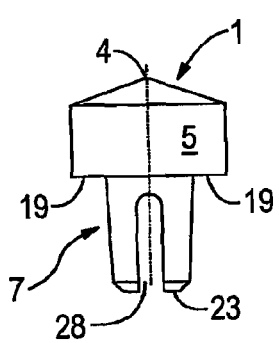
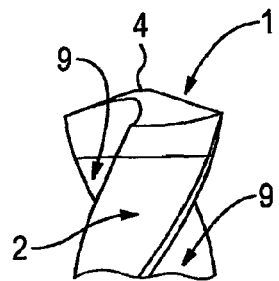
Fig. 11
Fig. 13
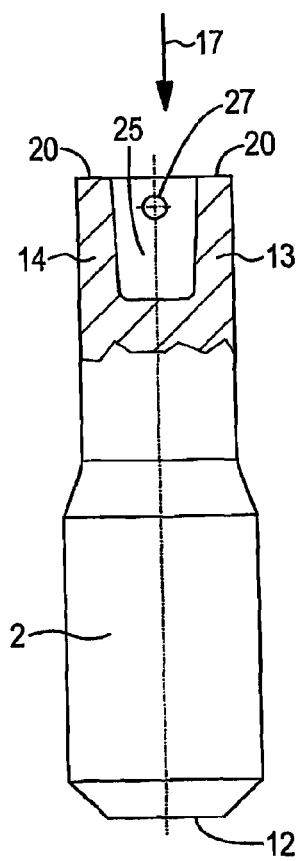
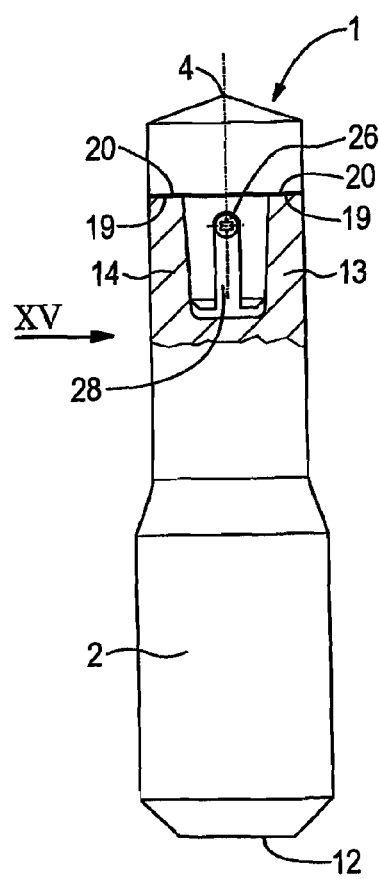
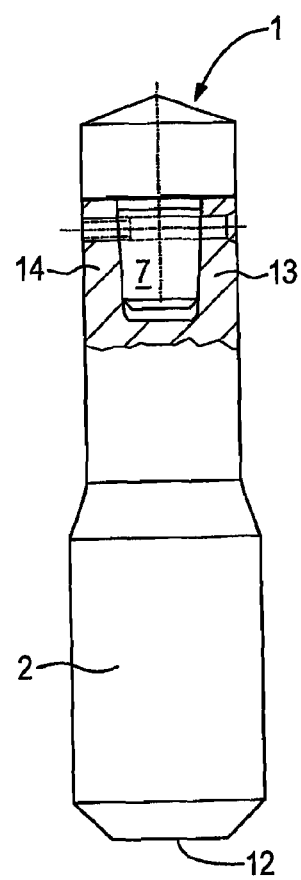
Fig. 12
Fig. 14
Fig. 15

TWIST DRILL WITH A REPLACEABLE CUTTING INSERT AND A ROTARY CUTTING TOOL WITH A REPLACEABLE CUTTING INSERT

CONTINUING APPLICATION DATA

This application is a continuation of application Ser. No. 11/438,971 filed on May 23, 2006, now U.S. Pat. No. 7,306,410, which is a continuation of application Ser. No. 10/377,588 filed on Feb. 28, 2003, now U.S. Pat. No. 7,048,480, which is a Continuation-In-Part application of International Patent Application No. PCT/EP01/09916, filed on Aug. 29, 2001, which claims priority from Federal Republic of Germany Patent Application No. 100 42 990.4, filed on Sep. 1, 2000. International Patent Application No. PCT/EP01/09916 was pending as of the filing date of this application. The United states was an elected state in International Patent Application No. PCT/EP01/09916.

BACKGROUND OF THE INVENTION

1. Field of the Invention

The present invention relates to a twist drill for drilling holes in a material. Twist drills, in general, have drill points or tips that initially cut into a material to be drilled. The material is then subsequently contacted by the cutting edges and cutting faces located adjacent the drill point or tip. The cutting edges produce chips which are deflected and shaped by the drill flutes. The drill flutes can extend over a substantial length of the body of the drill in a helical manner. The drill body is held in a drill chuck, which holds the drill body securely.

It is important to note that substantial stresses are exerted on a drill during drilling. Therefore, the drill should preferably be sufficiently strong and durable. Further, the stresses exerted on the drill tip, cutting faces, and cutting edges are higher than those stresses exerted on the drill body. Therefore, it is preferable that the drill tip, cutting faces, and cutting edges be stronger and more durable than the drill body.

In addition, because of the substantial stresses exerted on the drill tip, cutting faces, and cutting edges, it usually becomes necessary to sharpen these areas of the drill by grinding them. However, such a sharpening process over time shortens the length of the drill. Also, the sharpening process requires that the entire drill body be sufficiently strong and durable such that as the drill is ground and sharpened, the cutting end of the drill is not weakened and thus rendered inadequate to withstand the high stresses exerted on the cutting end.

To overcome the disadvantages of sharpening the drill tip, cutting faces, and cutting edges, it is well known to produce a replaceable insert that can be inserted into the body of the drill. The insert, when sufficiently worn by use in drilling, can be removed and replaced with a new insert. The insert often contains the entire cutting end of the drill, including the drill tip, the cutting faces, the cutting edges, as well as portions of the chip flutes. Such an insert is connected to the drill body in a secure but removable fashion. Other inserts can be less comprehensive, and may only contain portions of the cutting end, such as the drill tip and/or portions of the cutting edges and cutting faces.

This invention further relates to a rotary cutting tool, e.g. a drill, a milling cutter, a reamer or similar device with a tool head made of or including at least one hard cutting material, e.g. a tungsten carbide cutting alloy, oxide ceramic or similar material and with a tool shank that fixes the tool head in position coaxially, which tool shank, on its holding end opposite the machine-side chucking end, frictionally presses a fixing lug that projects coaxially out of the shank-side end surface of the tool head, whereby the end surface functions as an axial stop toward the tool shank, with the inner flanks of two clamping extensions that project essentially in the axial direction from the tool shank and are one piece with the tool shank.

Solid tungsten carbide drills (VHM drills) of the prior art are regularly manufactured in one piece. On these drills, the drill tip and drill shank are. inseparable. However, the prior art also includes drills in which a VHM cutting body is soldered into the shaft or in which the VHM cutting body is detachably connected with a steel shank. On a drill of the prior art described in WO 96/11079 the one-piece tool head is clamped between the flanks of two clamping extensions that project in the axial direction from a tool shank which is made of high-speed tool steel. This combination drill with a steel shank and replaceable carbide tips can be manufactured easily only for drill diameters that are larger than 10 mm. A particular problem with such drills is that it is difficult to achieve a degree of precision and accuracy sufficient to guarantee that the tips can be replaced without problems and that the parts are absolutely concentric.

2. Background Information

On a drill of the prior art described in EP-B1-0 118 806 having a tool head made of or including at least one hard cutting material, e.g. a tungsten carbide cutting alloy, oxide ceramic or similar material and with a tool shank that fixes the tool head in position coaxially, which tool shank, on its holding end opposite the machine-side chucking end, frictionally presses a fixing lug that projects coaxially out of the shank-side end surface of the tool head, whereby the end surface functions as an axial stop toward the tool shank, with the inner flanks of two clamping extensions that project essentially in the axial direction from the tool shank and are one piece with the tool shank, the clamping of the tool head is accomplished by means of a fastening peg that is attached to the drill head and is concentric to the drill axis, and which holds a cutting insert that forms the tool head concentrically in a peg receptacle on the tool shank. The fastening peg is undercut in the periphery of the peg so that it can be inserted from the chip flute laterally into the peg receptacle. After the insertion into the peg receptacle, the cutting insert and the fastening peg that is one piece with it are twisted in the manner of a bayonet connection opposite to the direction of rotation of the drill until stop surfaces provided on the fastening peg come into contact with corresponding stop surfaces of the peg receptacle. The desired frictional clamping of the cutting insert impossible because the cylindrical surface of the fastening peg has undercut stop surfaces on the periphery of the peg. The cutting insert is braced against the cutting forces by the rear wall and the shank-side edge of the recess that is designed to hold it. The cutting forces press the cutting insert into its seat so that it is fixed in position without additional fastening means. This arrangement means that the essential replacement of the fastening screw that holds the cutting insert is a complicated and time-consuming operation. The undercut on the periphery of the peg also has an adverse effect on the desired accuracy of rotation.

U.S. Pat. No. 2,294,969 A describes a drill that is equipped in the vicinity of its cutting tip with tungsten carbide cutting plates, and which is equipped on its cutting end with an axially projecting tip drill insert. The purpose of this axially projecting tip drill insert is to protect the tungsten carbide cutting plates. The middle part of the tip drill insert, which middle part is surrounded over its entire periphery by the drill shank, is realized in the form of a clamping cone. Moreover, the end of the tip drill insert farther from the drill tip is square, to ensure a torque drive by the drill shank. The drill tip area of the tip drill insert that has the chip flutes on its generated surface is surrounded by axial extensions of the drill shank. However, these extensions do not perform any clamping action.

OBJECT OF THE INVENTION

The object of the invention is to create a twist drill and a rotary cutting tool of the type described above that can also be easily manufactured for drill diameters less than 10 mm and is highly accurate in terms of rotation and concentricity.

SUMMARY OF THE INVENTION

This object is accomplished in a rotary cutting tool, e.g. drill, milling cutter, reamer or similar tool with a tool head made of or including at least one hard cutting material, e.g. a tungsten carbide cutting alloy, oxide ceramic or similar material and with a tool shank that fixes the tool head in position coaxially, which tool shank, on its holding end opposite the machine-side chucking end, frictionally presses a fixing lug that projects coaxially out of the shank-side end surface of the tool head, whereby the end surface functions as an axial stop toward the tool shank, with the inner flanks of two clamping extensions that project essentially in the axial direction from the tool shank and are one piece with the tool shank, characterized by the fact that the clamping surfaces of the fixing peg form the generated surfaces of a truncated cone that projects from the base body of the tool head in its insertion direction and is concentric with the longitudinal axis of the tool shank. The teaching of the invention, in contrast to the teaching of EP-B1-0 118 606, is that the bilateral clamping surfaces of the tool head and of the clamping extension of the tool shank that are in contact with each other all lie on the surface of a truncated cone which is coaxial with the longitudinal axis of the tool shank, which truncated cone tapers toward the end of the tool shank when it is clamped in the machine tool. On the tool-side end of the tool shank, the tool head lies with the generated surfaces of its fixing peg, which projects in the insertion direction, pressed like the lathe center of the tail stock of a lathe between the hollow conical segments of the clamping cone that thereby act like the jaws of a chuck. The angle of inclination of the conical surfaces of the fixing peg with respect to the shank axis is approximately 3°. The cone in question has, in particular, a gradient of 1:10.

To further discuss, the fixing peg has a center longitudinal axis, which center longitudinal axis is to be substantially aligned with the shank axis upon insertion of the fixing peg into the receptacle. The outer conical surfaces of the fixing peg slope at an angle with respect to the axes of both the fixing peg and the shank. Therefore the generatrix, or line which defines the cone surface, and the center axes define an angle. The angle is approximately 3°, which means it could also be, in at least one possible embodiment, 1°, 2°, 3°, 4°, 5°, 6°, 7°, 8°, 9°, or 10°, in whole or tenth of a degree increments within this range of one to ten degrees. In any event, it is preferable to maintain a small angle of approximately 3° to increase the friction fit between the fixing peg and the two clamping extensions. For example, as is well known in high school level solid geometry, if the angle of the generatrix of a cone-shaped object with respect to a center axis is substantial, such as approximately 60°, then the cone-shaped object could be easily dislodged in the axial direction from a complementary receiving or holding structure. Therefore, in the present invention, if the angle defined by the generatrix of the conical fixing peg with respect to the center axes is substantial, the drilling insert would be easily dislodged from the drill shank. As is also well known in high school level solid geometry, if the angle of the generatrix of a cone-shaped object with respect to a center axis is small, such as approximately 3° or 4°, then the cone-shaped object would not be easily dislodged in the axial direction from a complementary receiving or holding structure. This is the case in the present invention since a secure friction fit is desirable.

The base circle diameter of the conical shape of the fastening peg of the tool head is smaller than the radial dimension, and in particular smaller than the diameter of the base body of the spiral flute head. In the fixed position, the tool head comes into contact with an end surface in the manner of a ring flange on the end surfaces of the clamping extension and acts as an axial stop. When the tool head is in the axial stop position, the clamping heads are slightly elastic with respect to each other. This feature supports the frictional active clamping action of the conical envelope surfaces of the clamping extension against the corresponding clamping surfaces of the fixing peg of the tool head.

To further explain, in at least one embodiment of the present invention, the replaceable cutting insert or tool head contains the cutting end portion of the rotary cutting tool or drill, which cutting end portion includes the tip, the cutting edges, the end portion of the drill body, and a portion of the chip flutes. The cutting insert has a base body portion and a projection or fixing peg that is conical in shape and which extends from the base body. The drill body has a conical receptacle that is configured to correspond to the conical projection. On opposite sides of the conical receptacle are two flexible extension portions that act like clamps to hold the conical projection by means of friction between the matching conical surfaces. The base body of the cutting insert has a substantially flat surface around the larger conical base portion of the projection, which substantially flat surface corresponds to and contacts end surfaces on the ends of the two flexible extension portions.

Such a configuration can be advantageous in smaller drills of less than approximately 10 millimeters, or approximately ⅜ inch, in diameter. With drills of this size, it is very difficult to develop a replaceable cutting insert or tool head that can be easily manufactured without extremely precise measuring and complicated machining. With such little material to work with, the possibilities as to how to develop a replaceable cutting insert for such a small drill are limited.

The present invention, in at least one possible embodiment, shows that when a receptacle is created in the end of the drill body, flexible extension portions are created. In most any larger drill of similar design, there is virtually no flexibility in the sides of the receptacle in the drill body because the sides are too thick and hard. However, in a small drill of less than 10 mm, the removal of a substantial portion of the center of the end of the drill creates very small and thin sides or extensions. By virtue of the thinness of these extensions, they have a certain flexibility which is not found in larger drills. Further, such thin sides would not appear to be practical in larger drills because of the heavier stresses exerted on larger drills during use which would possibly cause such thin sides to break.

The conical shape of the projection and matching receptacle and the flexibility of the extending portions also compensate for manufacturing tolerances. For example, it is generally preferable when manufacturing a drill with a removable cutting insert that the portion of the insert that is inserted into the drill shaft be of matching size and dimensions as the receptacle to promote engagement of the surfaces of the projection and the receptacle. However, to achieve such a close fit, extremely precise machining is usually required, which precise machining is undesirable because it can often be complicated, time-consuming, expensive, and not always accurate. This fact is especially true for cylindrical insert portions. A cylindrical insert portion must be machined exactly to fit into a matching cylindrical receiving area in a drill. It the cylindrical insert portion is too big it will not fit, and if it is too small it will likely be easily dislodged or moved out of alignment with the center axis. There is very little to no compensation for manufacturing tolerances with a cylindrical insert portion. In contrast in the present invention, the sides of the receptacle are flexible, and thus the receptacle can expand or contract to compensate for differences in the size and dimensions of the conical projection with respect to the conical receptacle. Further, the conical shape of the projection causes it to act somewhat like a wedge when it is inserted into the flexible conical receptacle to spread the extensions apart. The wedge-like action of the projection on the receptacle actually increases the friction fit between the surfaces of the projection and the receptacle by pressing them more tightly together.

Basically, for the transmission of torque, the adhesive force or friction fit, as discussed above, between the conical clamping surfaces of the tool head on one hand and the tool shank or its clamping extensions on the other hand are sufficient, in particular for small drill diameters. To further explain, the friction fit between the surfaces of the projection and the flexible extensions can be sufficient to transmit torque and retain the replaceable cutting insert in the drill body during a drilling operation. However, to also make it possible to transmit higher torques, as disclosed in the features of the invention herein below, at least one embodiment of the present invention teaches the provision in the vicinity of one axial end of the clamping cone of the tool head of at least one driver surface for an also positive-fit torque transmission from the tool shank to the tool head. When the tool head is in the fixed position, this driver surface is in contact with a corresponding mating surface on the tool shank. It is appropriate if at least two driver surfaces parallel to each other are provided diametrically opposite each other on the tool head which, when the tool head is in the fixed position on the tool shank, correspond to corresponding driver surfaces on the tool shank. A configuration like the one described above and in the features of the invention herein below is advantageous.

The driver surface or driver surfaces for the likewise conjugate transmission of torque can also appropriately be parts of one of a lobe that is in front of the tapered end of the clamping cone, in the insertion direction, which lobe corresponds with a recess on the end surface of the tool shank suitable for the corresponding torque transmission.

As disclosed in the features of the invention herein below, a positive-fit torque drive is also effected or assisted by a clamp fixing screw, a bolt, a spiral dowel pin, a rivet or similar device that runs through the clamping extension and the tool head or its fixing peg. A torque driver of this type also causes an increase of the double-jaw-like clamp fixing pressure that is exerted on the conical clamping surfaces by the clamping extensions of the tool shank. These means for torque driving or to increase the radial clamping fixing pressure advantageously lie in a passage hole that runs radially through the clamping cone. However, it is also possible with comparable effectiveness for the clamp fixing screw or similar device to lie in a-slot, the longitudinal axis of which runs diametrically, that runs radially in the clamping cone and is open toward the tapered end of the clamping cone. This arrangement makes it easier to replace the tool head.

Finally, it is also possible, to achieve an axially acting positive-fit fixing of the tool head on the tool shank, to provide a detachable snap connection which is activated when the tool head is in the fixed position. The physical configuration of a snap connection of this type is disclosed herein below in the features of the invention. It is thereby unimportant in terms of effectiveness whether a snap lug is part of the conical surface or of the driver area next to the conical surface in the axial direction and the mating surface for the snap lug is part of the tool shank or its clamping extension, or vice versa, i.e. if one snap lug is part of the tool shank and the recess that forms the mating surface is part of the tool head.

In the fixing position, the chip flute of the cutting tool, e.g. the spiral flute of the drill, runs in the space between the clamping extensions. The base of the chip flute is thereby recessed into the surface of the fixing peg, which does not perform any positive clamping function in the space between the clamping extensions, but is open toward the radial outside so that it can effectively perform its chip-guidance function.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The object of the invention is explained in greater detail below with reference to the exemplary embodiments illustrated in the accompanying figures, in which:

FIG. 11 is a side view of a modified embodiment of the tool head;

FIG. 12 is a side view—partly in section—of a tool shank suitable for holding the tool head illustrated in FIG. 11;

FIG. 13 is a side view of a drill tip with the tool head inserted in the clamp fixing position;

FIG. 14 is a side view—partly in section—of the tool shank illustrated in FIG. 12 with the tool head illustrated in FIG. 11 inserted in the clamped, fixed position;

FIG. 15 is a side view in the direction of Arrow XV of the drill illustrated in FIG. 14;

Figure 2:
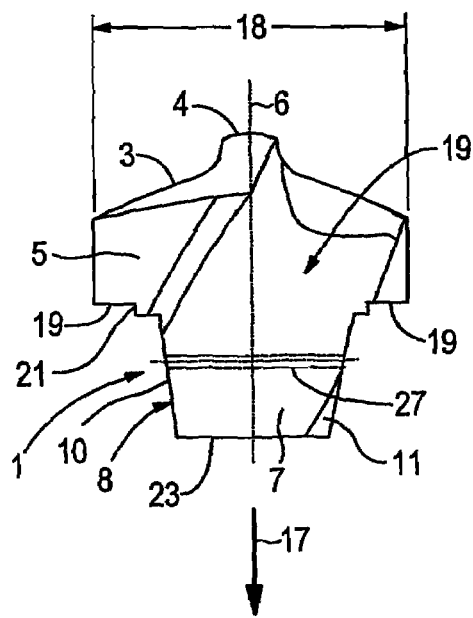
FIG. 2 is an isolated side view of the tool head illustrated in FIG. 1.

The drill that is illustrated as an exemplary embodiment of a rotary cutting tool contains, as the essential components, a tool head 1 made of a hard cutting material, e.g. tungsten carbide, oxide ceramic or a similar material, and a tool shank 2 made of a high-speed tool steel or another metal material. The tool head 1 carries the cutting edges 3. From the side of its base body 5 facing away from the tip 4 and toward the tool shank 2, a fixing peg 7 projects that is coaxial with the longitudinal axis 6 of the tool, which fixing peg 7 is in the shape of a truncated cone 8 that tapers toward the tool shank 2 with the longitudinal axis 6 as the cone axis.

In the periphery of the tool head 1—starting from the cutting edges 3—there are two spiral flutes 9 that act as chip flutes. The two spiral flutes 9 extend over the periphery both of the base body 5 and also of its fixing peg 7. They therefore divide the surface of the fixing peg 7 or of the truncated cone 8 into two truncated cone generated surfaces 10, 11 that lie essentially diametrically opposite each other and are continued on the periphery of the tool shank 2.

The tool shank 2 clamps the replaceable tool head 1 in position on its holding end which is opposite the chucking end 12 on the machine-tool side between the facing flanks of the two clamping extensions 13, 14 which project essentially in the axial direction from the tool shank 2. The conical generated surfaces 10, 11 of the fixing peg 7 that are diametrically opposite each other and are separated from each other by the two spiral flutes in the peripheral direction are, in the clamping position, pressed by the facing flanks of the two clamping extension 13, 14 of the tool shank 2. The inner flanks 15, 16 which face each other of the clamping extensions 13, 14 are realized in a concave shape corresponding to the convex truncated cone generated surfaces 10, 11 of the fixing peg 7, so that in the fixing position (FIGS. 1, 3, 5, 8, 9, 14 and 15) they press with their entire surfaces against the truncated cone generated surfaces 10, 11 of the fixing peg 7. The axial insertion direction 17 of the tool head 1 into the tool shank 2 is indicated by a directional arrow.

The passive truncated cone generated surfaces 10, 11 of the fixing peg 7 of the tool head 1 or of the cone surface described by them have a base circle diameter that is smaller than the radial dimension or the diameter 18 of the base body 5 of the tool head 1. The transition from the base body 5 to the fixing peg 7 between the spiral flutes 9 thereby forms distinctive axial stops 19. In the fixed position, the tool head 1 is in contact with the two axial stops 19 on the end surfaces 20 facing it of the clamping extensions 13, 14.

In the vicinity of one axial end of the fixing peg 7 or of its truncated cone generated surfaces 10, 11, the tool head 1 has at least one radially active driving surface 21 and/or 22 for a positive-fit torque transmission from the tool shank 2 to the tool head 1. This driver surface 21 or 22, when the tool head 1 is in the fixed position, is tangent to a corresponding matching surface on the tool shank 2. In the exemplary embodiment illustrated in FIGS. 1 to 3, the driver surface 21 is in the area that represents the transition from the fixing peg 7 to the base body 5.

In the case of the exemplary embodiment illustrated in FIGS. 4 to 7 and FIGS. 16 and 17, the driver surface 22 is located in the vicinity of the tapered end 23 of the fixing peg and is ahead of it in the insertion direction 17. The two driver surfaces 21, 22 are realized and work in the form of flat surfaces in the manner of the opening of a wrench. In the case of the positioning in the vicinity of the tapered end 23 of the fixing peg, the driver surface 22 is part of the periphery of a driver peg 24 which is in front of the tapered end of the fixing peg or clamping cone 23 in the insertion direction 17. The driver peg 24 thereby projects under torque into the central recess 25 on the chuck end of the tool shank 2 between the two clamping extensions 13, 14. The driver surfaces 22 thereby come into contact with the mating surfaces 31 that flank the central recess 25 on both sides below the conical-surface-shaped concave inner flanks 15, 16 of the two clamping extension 13, 14.

In the exemplary embodiment illustrated in FIGS. 1 to 3 and FIGS. 12 to 15, a clamp fixing screw 26 screwed in from the peripheral side of the tool shank 2 runs through the fixing peg 7 and the clamping extensions 13, 14 that clamp it in position. The clamp fixing screw 26 not only represents a positive-fit connection between the clamping extensions 13, 14 and the fixing peg 7, but also increases the clamping pressure, which is exerted radially by the clamping extensions 13, 14 acting like the jaws of pliers on the truncated cone generated surfaces 10, 11 of the driver peg 24.

Figure 3:
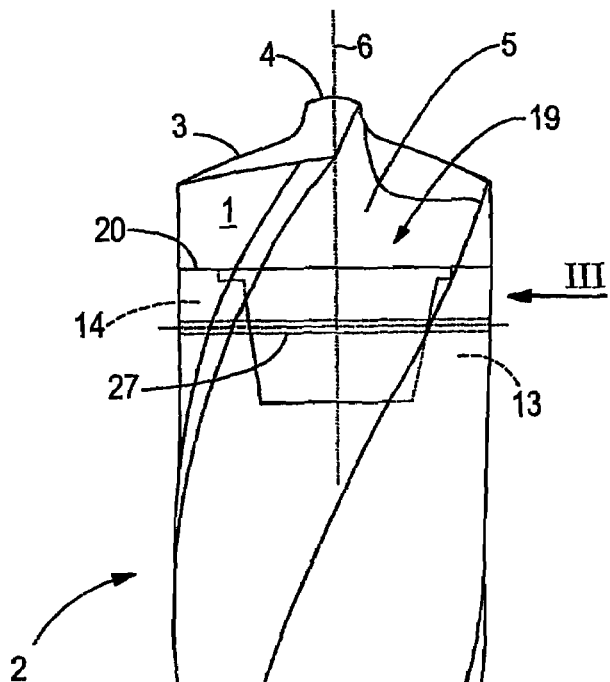
FIG. 3 is a detailed view of the drill tip in the direction indicated by the Arrow III in FIGS. 1 and 2.
Figure 3:
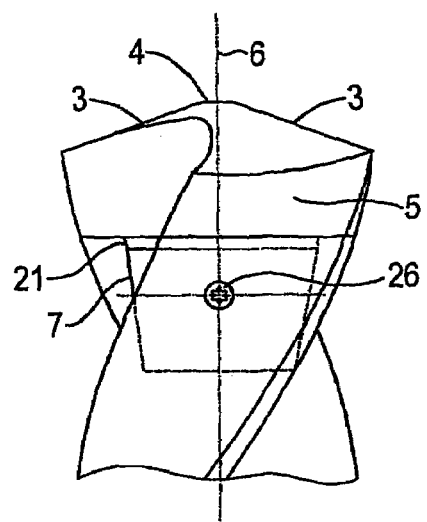
Figure 1:
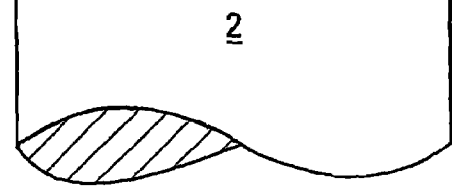
FIG. 1 is an overall view of a drill with a tool head made of a hard cutting material, e.g. tungsten carbide, with an inserted drill bit clamped to its drill tip.
Figure 4:
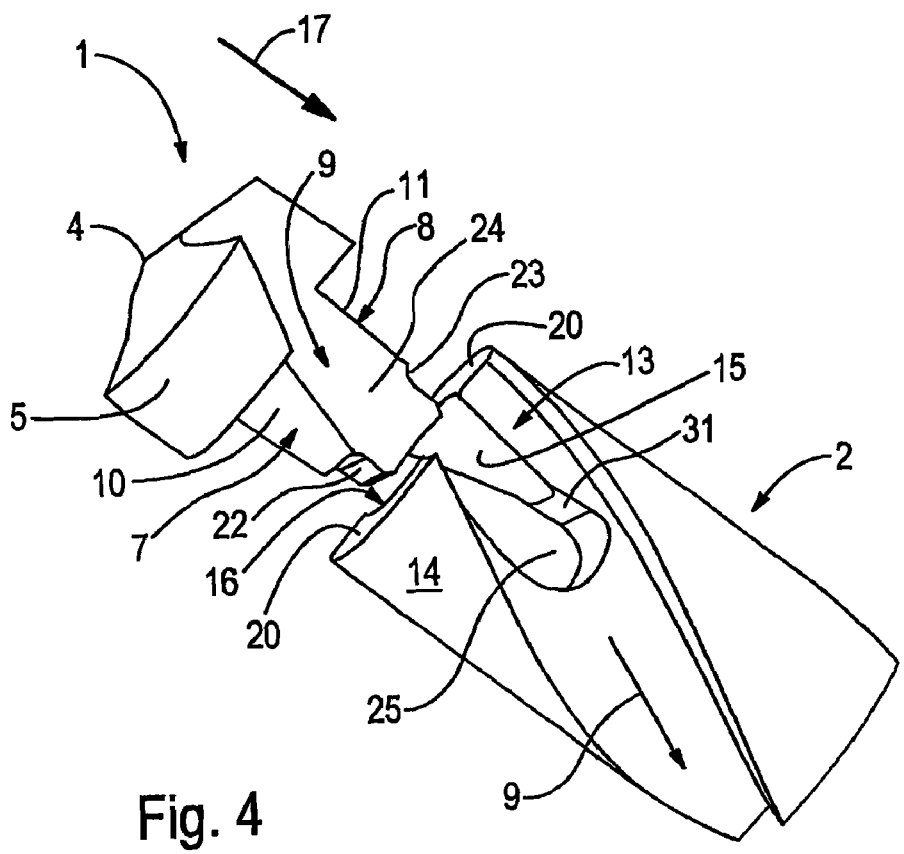
FIG. 4 is an exploded view in perspective of the tool-head-side end of the tool shank and of the tool head in their rotational positions ready for the insertion that will fix them in their positions with respect to one another.
Figure 5:
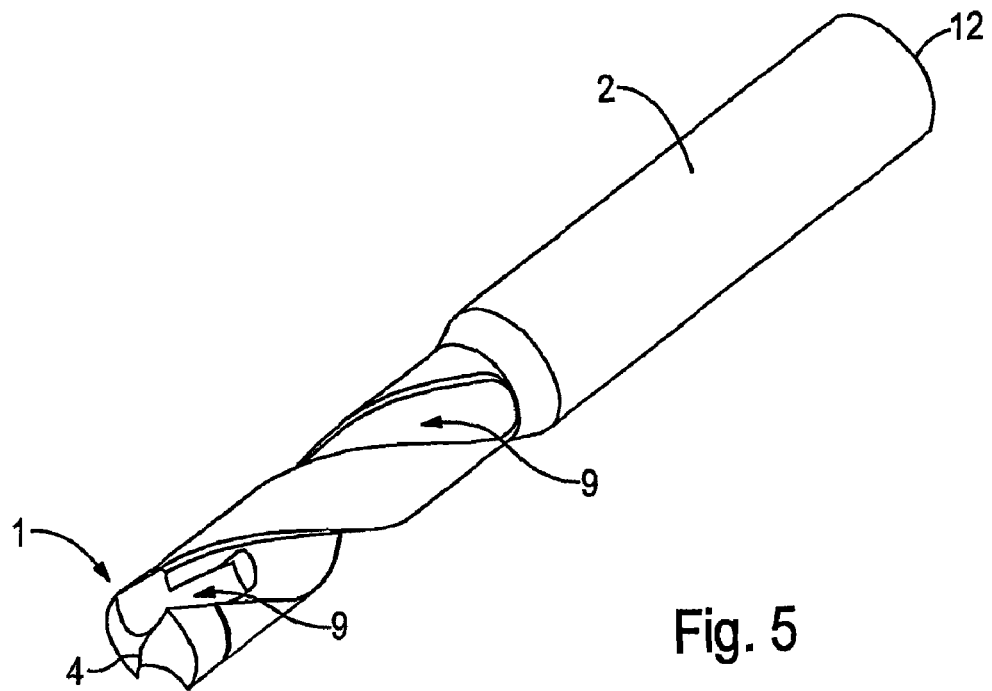
FIG. 5 is an overall view in perspective of the tool shank with tool head inserted in the clamp fixing position.
Figure 6:
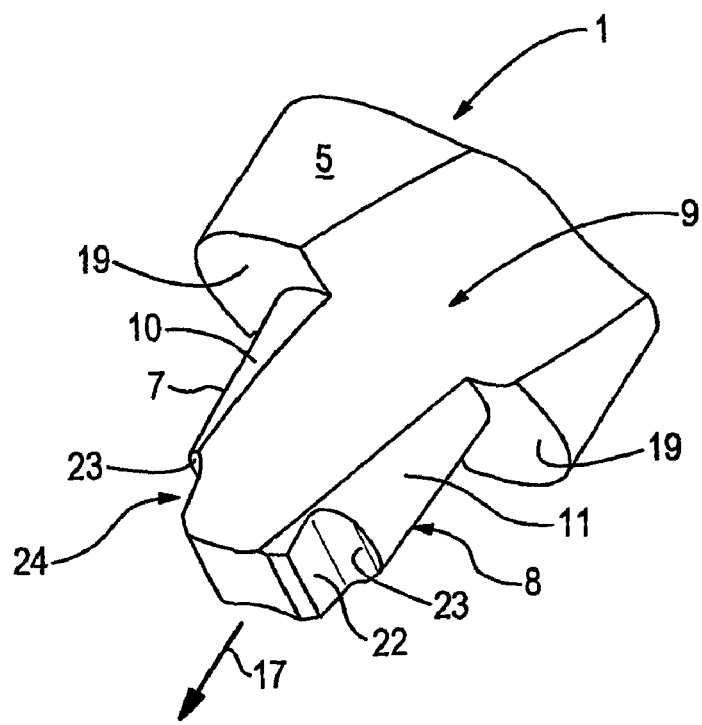
FIG. 6 is an overall view in perspective of the fixing end of another realization of the tool head.
Figure 7:
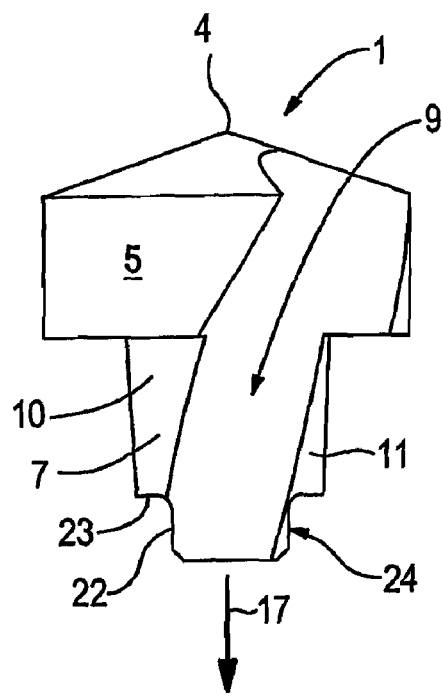
FIG. 7 is a side view of the tool head illustrated in FIGS. 4, 5 and 6.
Figure 8:
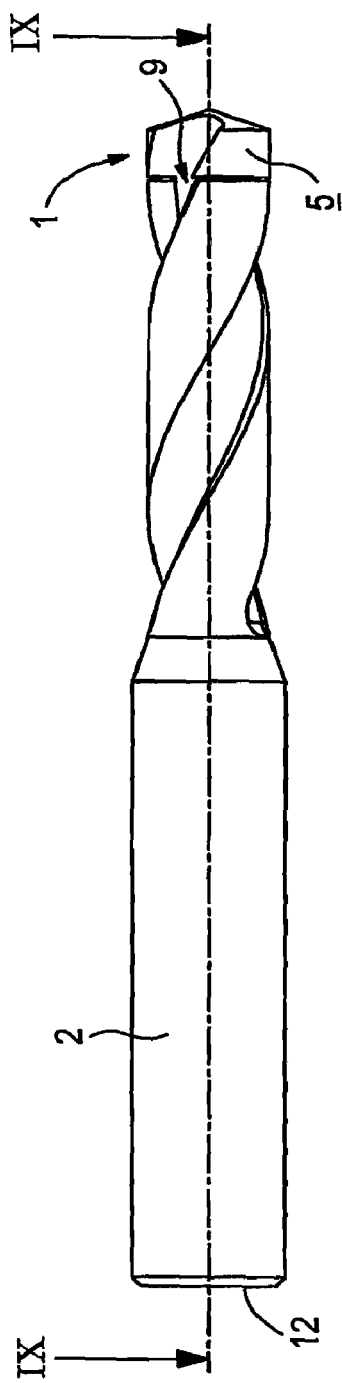
FIG. 8 is a side view of the complete drill with the tool head in the clamped, fixed position sitting on the tool shank.
Figure 9:
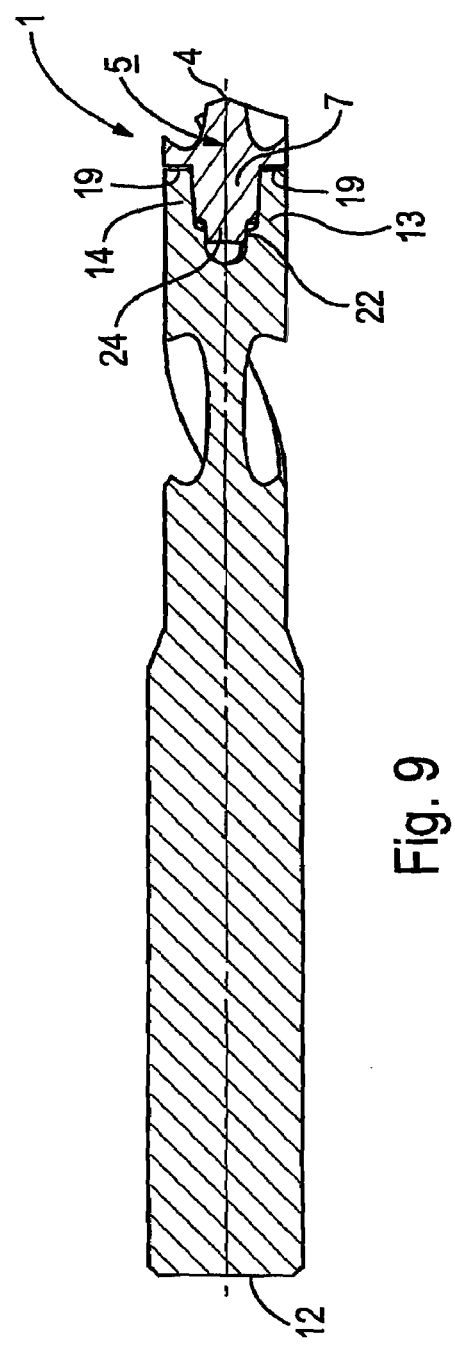
FIG. 9 is a sectional view along Arrow IX-IX in FIG. 8.
Figure 10:
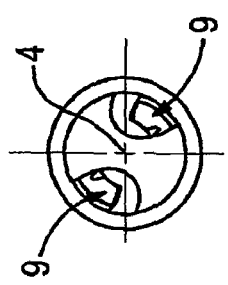
FIG. 10 is a head-on view of the drill tip in the direction of Arrow X in FIG. 8.

In the embodiment illustrated in FIGS. 1 to 3, the clamping fixing screw 26 lies in a passage hole 27 that runs radially through the fixing peg 7. In the case of the exemplary embodiment illustrated in FIGS. 11 to 15, the clamp fixing screw 26 lies inside a slot 28, the longitudinal axis of which runs diametrically, and which slot runs radially inside the fixing peg 7 and is open toward the tapered end 23 of the fixing peg.

Figure 16:
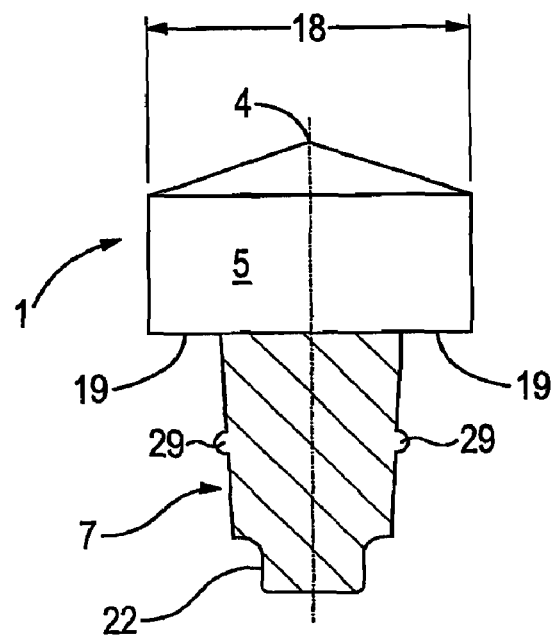
FIG. 16 is a schematic side view of a modified embodiment of the tool head.
Figure 17:
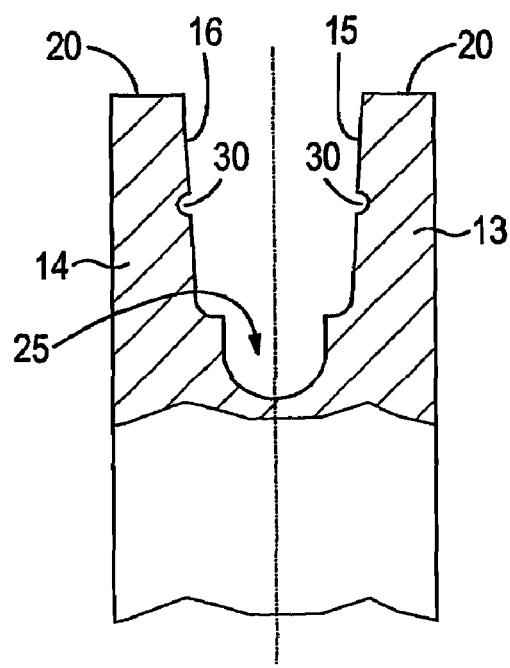
FIG. 17 is a side view of the tool-side end of the tool shank for holding the tool head realized as illustrated in FIG. 16.

In the exemplary embodiment illustrated in FIGS. 16 and 17, there is a detachable snap connection in the fixing position of the tool head 1 on the tool shank 2. In the fixing position of the tool head 1 it forms an additional, axially active positive protection against displacement. The snap connection consists of snap lugs 29 that are one piece with the conical surface or a truncated cone generated surface 10 or 11, and are diametrically opposite each other. In the fixing position, the snap lugs 29 of the fixing peg 7 snap into corresponding recesses that act as mating surfaces on the inner flanks 15, 16 of the clamping extensions 13, 14.

When the tool head 1 is in the fixed position with respect to the tool shank 2, the spiral flutes 9 lie in the space between the two clamping extensions 13, 14. They therefore lie completely exposed on the periphery of the drill and their function as chip flutes is thereby unrestricted. The base of the spiral flutes 9 is shaped concavely into the truncated cone generated surfaces 10, 11 of the fixing peg 7.

One feature (or aspect) of an embodiment of the invention resides broadly in a rotary cutting tool, e.g. drill, milling cutter, reamer or similar tool with a tool head (1) made of or including at least one hard cutting material, e.g. a tungsten carbide cutting alloy, oxide ceramic or similar material and with a tool shank (2) that fixes the tool head (1) in position coaxially, which tool shank (2), on its holding end opposite the machine-side chucking end (12), frictionally presses a fixing lug (7) that projects coaxially out of the shank-side end surface of the tool head (1), whereby the end surface functions as an axial stop (19) toward the tool shank (2), with the inner flanks of two clamping extensions (13, 14) that project essentially in the axial direction from the tool shank (2) and are one piece with the tool shank (2), characterized by the fact that the clamping surfaces of the fixing peg (7) form the generated surfaces (10, 11) of a truncated cone that projects from the base body (5) of the tool head (1) in its insertion direction (17) and is concentric with the longitudinal axis of the tool shank (2).

Another feature or aspect of an embodiment of the invention resides broadly in a cutting tool characterized by the fact that the base circle diameter of the fixing peg (7) is smaller than the radial dimension, in particular than the diameter (18) of the base body (5) of the tool head (1).

Yet another feature or aspect of an embodiment of the invention resides broadly in a cutting tool characterized by the fact that the tool head, in the vicinity of one axial end of the fixing peg (7), has at least one driver surface (21, 22) for additional transmission of torque from the tool shank (2) to the tool head (1), which driver surface (21, 22), when the tool head (1) is in the fixed position, presses against a corresponding mating surface on the tool shank (2).

Still another feature or aspect of an embodiment of the invention resides broadly in a cutting tool characterized by the fact that the driver surface (21) is realized so that it transmits torque at the transition from the base body (5) of the tool head (1) to the fixing peg (7).

A further feature or aspect of an embodiment of the invention resides broadly in a cutting tool characterized by the fact that the driver surface (22) is positioned in the vicinity of the tapered end (23) of the fixing pin and is in front of the tapered end (23) of the fixing pin in the insertion direction (17) and when the tool head is in the fixed position, projects under torque into a central recess (25) on the clamping end of the tool shank (2).

Another feature or aspect of an embodiment of the invention resides broadly in a cutting tool characterized by the fact that the driver surface (21, 22) is realized in the form of a flat surface in the manner of the opening of a wrench.

Yet another feature or aspect of an embodiment of the invention resides broadly in a cutting tool characterized by a torque driver that runs approximately diametrically through the fixing peg (7) and the clamping extensions (13, 14) that clamp it in place, e.g. a clamp fixing screw (26) that can be screwed in from the peripheral side of the tool shank, to increase the radial clamping force that is applied in the manner of the jaws of pliers and is exerted by the clamping extensions (13, 14) on the clamping cone surfaces (10, 11).

Still another feature or aspect of an embodiment of the invention resides broadly in a cutting tool characterized by the fact that the clamping screw (26) lies in a passage hole that runs radially through the fixing peg (7).

A further feature or aspect of an embodiment of the invention resides broadly in a cutting tool characterized by the fact that the clamping screw (26) lies inside a slot (28), the longitudinal axis of which is oriented diametrically, that runs radially inside the fixing peg (7) and is open toward the tapered end (23) of the fixing peg.

Another feature or aspect of an embodiment of the invention resides broadly in a cutting tool characterized by a detachable snap connection between the tool head (1) on one hand and the tool shank (2), in particular a fixing peg (7) of the tool shank (2) on the other hand, which snap connection, when the tool head (1) is in the fixed position, is locked as an additional protection against displacement, in particular against axial displacement.

Yet another feature or aspect of an embodiment of the invention resides broadly in a cutting tool characterized by a snap lug (29) that is one piece with the cone surface or with a driver surface that is adjacent to the cone surface in the axial direction and projects radially from said surface, as a snap coupling and with a recess (30) in a clamping extension (13, 14) or in the tool shank (2) as a mating surface, or vice versa, with the same effect.

Another feature or aspect of an embodiment of the invention resides broadly in a cutting tool with at least one chip flute that is oriented essentially axially and extends in the axial direction from the tool head to the periphery of the tool shank, e.g. with the spiral flute (9) of a drill, characterized by the fact that when the tool head (1) is in the fixed position, the chip flute (9) runs in the space between the clamping extensions (13, 14).

Yet another feature or aspect of an embodiment of the invention resides broadly in a cutting tool characterized by the fact that the chip flute (9) is shaped into the surface of the fixing peg (7) and optionally into a portion of the periphery of the driver peg (24).

One feature or aspect of an embodiment of the invention resides broadly in a twist drill having a diameter of less than approximately ten millimeters, said twist drill comprising: a shaft having a center longitudinal axis and comprising a first end and a second end disposed opposite said first end; said first end of said shaft comprising a shank portion being configured to be inserted into and held by a tool holder; a replaceable drilling insert being removably attached to said second end of said shaft; said drilling insert comprising a drill tip being configured to cut an object and at least one cutting edge being configured to cut an object; at least a first chip flute and a second chip flute being disposed in a helical manner about and along a substantial portion of said shaft; each of said first and second chip flutes comprising a first chip flute portion disposed on said shaft and a second chip flute portion disposed on said drilling insert; said second end of said shaft comprising two extending portions being disposed opposite one another and to extend away from said second end of said shaft substantially along the center longitudinal axis of said drill; said second end of said shaft comprising a receptacle structure formed by said two extending portions; said receptacle structure comprising a bottom wall disposed between and connected to said two extending portions; said drilling insert comprising a body portion and a fixing peg being disposed to project coaxially away from said body portion; said fixing peg being configured and disposed to be inserted into said receptacle structure to removably attach said drilling insert to said shaft; said drilling insert comprising a bearing surface disposed about said fixing peg; each of said two extending portions comprising an end face; said drilling insert bearing surface being complementary to said end faces of said two extending portions and being configured and disposed to contact and rest against said end faces of said two extending portions; said fixing peg being in the shape of a portion of a truncated cone, the base of which truncated cone being disposed at said bearing surface; said fixing peg having a center longitudinal axis; said fixing peg being disposed concentric with the center longitudinal axis of said drill and the center longitudinal axis of said fixing peg being substantially aligned with the center longitudinal axis of said drill; said fixing peg having two conical contact surfaces; said receptacle structure being in the shape of a portion of a truncated cone configured to receive said fixing peg; each of said two extending portions comprising a conical contact surface being complementary to said two conical contact surfaces of said fixing peg and being configured and disposed to contact said two conical contact surfaces of said fixing peg to create a friction fit between said fixing peg and said two extending portions; each of said conical contact surfaces having a conical angle, which is the angle defined by a generatrix of each of said conical contact surfaces with respect to the center longitudinal axis of said shaft; said conical angle being an angle at which said fixing peg is grasped and held in place by said two extending portions; said two extending portions being sufficiently flexible to compensate for manufacturing tolerances in at least one of said fixing peg and said receptacle structure, and to provide a clamping action to clamp said fixing peg in said receptacle structure, and to maximize alignment and concentricity of said drilling insert with respect to the center longitudinal axis of said drill; said two extending portions comprising a bore hole disposed transverse to the center longitudinal axis; said fixing peg comprising a bore hole disposed transverse to the center longitudinal axis and being configured and disposed to be aligned with said bore hole of said two extending portions; and a clamping screw being configured and disposed to run through said bore holes to clamp said two extending portions to said fixing peg to hold said drilling insert in said shaft.

Another feature or aspect of an embodiment of the invention resides broadly in a rotary cutting tool comprising: a shaft having a center longitudinal axis and comprising a first end and a second end disposed opposite said first end; said first end of said shaft comprising a shank portion being configured to be inserted into and held by a tool holder; a drilling insert being removably attached to said second end of said shaft; said drilling insert comprising a drill tip being configured to cut an object and at least one cutting edge being configured to cut an object; at least one chip flute being configured to facilitate removal of chips and being disposed along a portion of said shaft; said second end of said shaft comprising two extending portions being disposed opposite one another and to extend away from said second end of said shaft substantially along the center longitudinal axis of said drill; said second end of said shaft comprising a receptacle structure formed by said two extending portions; said receptacle structure comprising a bottom wall disposed between and connected to said two extending portions; said drilling insert comprising a body portion and a fixing peg being disposed to project away from said body portion; said fixing peg being configured and disposed to be inserted into said receptacle structure to removably attach said drilling insert to said shaft; said fixing peg being in the shape of a portion of a cone; said fixing peg having a center longitudinal axis; said fixing peg being disposed concentric with the center longitudinal axis of said drill and the center longitudinal axis of said fixing peg being substantially aligned with the center longitudinal axis of said drill; said fixing peg having two conical contact surfaces; said receptacle structure being in the shape of a portion of a cone configured to receive said fixing peg; each of said two extending portions comprising a conical contact surface being complementary to said two conical contact surfaces of said fixing peg and being configured and disposed to contact said two conical contact surfaces of said fixing peg to create a friction fit between said fixing peg and said two extending portions; each of said conical contact surfaces having a conical angle, which is the angle defined by a generatrix of each of said conical contact surfaces with respect to the center longitudinal axis of said shaft; said conical angle being an angle at which said fixing peg is grasped and held in place by said two extending portions; and said two extending portions being sufficiently flexible to compensate for manufacturing tolerances in at least one of said fixing peg and said receptacle structure, and to provide a clamping action to clamp said fixing peg in said receptacle structure, and to maximize alignment and concentricity of said drilling insert with respect to the center longitudinal axis of said drill.

A further feature or aspect of an embodiment of the invention resides broadly in a rotary cutting tool comprising: a shaft having a center longitudinal axis and comprising a first end and a second end disposed opposite said first end; said first end of said shaft comprising a shank portion being configured to be inserted into and held by a tool holder; a drilling insert being attached to said second end of said shaft; said drilling insert comprising a drill tip being configured to cut an object and at least one cutting edge being configured to cut an object; at least one chip flute being configured to facilitate removal of chips and being disposed along a portion of said shaft; said second end of said shaft comprising two extending portions being disposed opposite one another and to extend away from said second end of said shaft substantially along the center longitudinal axis of said drill; said second end of said shaft comprising a receiving structure formed by said two extending portions; said drilling insert comprising a body portion and a fixing peg being disposed to project away from said body portion; said fixing peg being configured and disposed to be inserted into said receiving structure to attach said drilling insert to said shaft; said fixing peg being in the shape of a portion of a cone; said fixing peg having a center longitudinal axis; said fixing peg being disposed concentric with the center longitudinal axis of said drill and the center longitudinal axis of said fixing peg being substantially aligned with the center longitudinal axis of said drill; said receiving structure being in the shape of a portion of a cone configured to receive said fixing peg; each of said two extending portions comprising a conical contact surface being complementary to the conical surface of said fixing peg and being configured and disposed to contact said fixing peg to create a friction fit between said fixing peg and said two extending portions; each of the conical surfaces having a conical angle, which is the angle defined by a generatrix of each of said conical contact surfaces with respect to the center longitudinal axis of said shaft; said conical angle being an angle at which said fixing peg is grasped and held in place by said two extending portions; and said two extending portions being sufficiently flexible to compensate for manufacturing tolerances in at least one of said fixing peg and said receiving structure, and to provide a clamping action to clamp said fixing peg in said receiving structure, and to maximize alignment and concentricity of said drilling insert with respect to the center longitudinal axis of said drill.

The components disclosed in the various publications, disclosed or incorporated by reference herein, may be used in the embodiments of the present invention, as well as equivalents thereof.

The following U.S. Patents regarding drills and/or drill inserts are hereby incorporated by reference as if set forth in their entirety herein: U.S. Pat. No. 5,800,100, issued to Krenzer on Sep. 1, 1998; NHL-KEH-06, issued to Kammermeier on Nov. 3, 1998; U.S. Pat. No. 5,967,710, issued to Krenzer on Oct. 9, 1999; U.S. Pat. No. 6,045,301, issued to Kammermeier et al. on Apr. 4, 2000; U.S. Pat. No. 6,116,825, issued to Kammermeier et al. on Sep. 12, 2000; U.S. Pat. No. 6,164,879, issued to Krenzer on Dec. 26, 2000; U.S. Pat. No. 6,210,083,issued to Kammermeier et al. on Apr. 3, 2001; U.S. Pat. No. 6,231,276, issued to Müller et al. on May 15, 2001; U.S. Pat.No. 5,904,455, issued to inventors Krenzer et al. on May 18, 1999; and U.S. Pat. No. 6,309,149, issued to inventor BORSCHERT on Oct. 30, 2001.

The appended drawings in their entirety, including all dimensions, proportions and/or shapes in at least one embodiment of the invention, are accurate and are hereby included by reference into this specification.

The following U.S. Patent Applications regarding drills and/or drill inserts are hereby incorporated by reference as if set forth in their entirety herein: Ser. No. 09/521,134, having inventors Gebhard MÜLLER and Horst JAGER, filed on Mar. 8, 2000; Ser. No. 09/927,921, having inventors Bernhard Walter BORSCHERT, Jochen STIES, Dieter Hermann MUHLFRIEDEL, and Karl-Heinz WENDT, filed on Aug. 10, 2001; Ser. No. 09/935,078, having inventors Hans-Wilm HEINRICH, Manfred WOLF, and Dieter SCHMIDT, filed on Aug. 22, 2001; Ser. No. 09/966,735, having inventor Ulrich KRENZER, filed on Sep. 28, 2001; and Ser. No. 10/008,528, having inventor Rudi HARTLOHNER, filed on Nov. 5, 2001.

All, or substantially all, of the components and methods of the various embodiments may be used with at least one embodiment or all of the embodiments, if more than one embodiment is described herein.

All of the patents, patent applications or patent publications, which were cited in the German Office Action issued Oct. 19, 2000, for corresponding German Application No. 100 42 990.4, and/or cited elsewhere are hereby incorporated by reference as if set forth in their entirety herein as follows: DE 198 34 635 A1, published Feb. 10, 2000, and International Publication WO 84/03241, published Aug. 30, 1984.

Some examples of twist drills that may possibly be utilized or adapted for use in at least one possible embodiment of the present invention may possibly be found in the following U.S. patents: U.S. Pat. No. 4,209,275, issued to Kim on Jun. 24, 1980; U.S. Pat. No. 4,556,347, issued to Barish on Dec. 3, 1985; U.S. Pat. No. 4,688,972, issued to Kubota on Aug. 25, 1987; U.S. Pat. No. 4,756,650, issued to Wakihira et al. on Jul. 12, 1988; U.S. Pat. No. 4,762,445, issued to Bunting et al. on Aug. 9, 1988; U.S. Pat. No. 5,230,593, issued to Imanaga et al. on Jul. 27, 1993; U.S. Pat. No. 5,350,261, issued to Takaya et al. on Sep. 27, 1994; U.S. Pat. No. 5,442,979, issued to Hsu on Aug. 22, 1995; U.S. Pat. No. 5,678,960, issued to Just et al. on Oct. 21, 1997; U.S. Pat. No. 5,931,615, issued to Wiker on Aug. 3, 1999; and U.S. Pat. No. 6,283,682, issued to Plummer on Sep. 4, 2001.

All of the patents, patent applications and publications recited herein, and in the Declaration attached hereto, are hereby incorporated by reference as if set forth in their entirety herein.

Some examples of other drills and drill inserts, features of which may possibly be utilized or adapted for use in at least one possible embodiment of the present invention may possibly be found in the following U.S. patents: U.S. Pat. No. 4,072,438, issued to Powers on Feb. 7, 1978; U.S. Pat. No. 4,131,383, issued to Powers on Dec. 26, 1978; U.S. Pat. No. 4,220,429, issued to Powers et al. on Sep. 2, 1980; U.S. Pat. No. 4,563,113, issued to Ebenhoch on Jan. 7, 1986; U.S. Pat. No. 5,173,014, issued to Agapiou et al. on Dec. 22, 1992; U.S. Pat. No. 5,236,291, issued to Agapiou et al. on Aug. 17, 1993; U.S. Pat. No. 5,807,041, issued to Lindblom on Sep. 15, 1998; U.S. Pat. No. 5,947,659, issued to Mays on Sep. 7, 1999; and U.S. Pat. No. 6,071,046, issued to Hecht et al. on Jun. 6, 2000.

All of the patents, patent applications or patent publications, which were cited in the International Search Report mailed on Dec. 17, 2001, for International Application PCT/EP01/09916, and/or cited elsewhere are hereby incorporated by reference as if set forth in their-entirety herein as follows: DE 196 05 157 A, issued Sep. 5, 1996; FR 907 980 A, issued Mar. 27, 1946; DE 524 677 C, issued May 11, 1931; U.S. Pat. No. 2,294,969 A, issued Aug. 8, 1942; U.S. Pat. No. 3,359,837 A, issued Dec. 26, 1967; U.S. Pat. No. 4,293,253 A, issued Oct. 6, 1981; and U.S. Pat. No. 1,461,548 A, issued Jul. 10, 1923.

Some examples of drills and/or drill bits with tungsten carbide that may possibly be utilized or adapted for use in at least one possible embodiment of the present invention may possibly be found in the following U.S. patents: U.S. Pat. No. 6,135,218, issued to Deane et al. on Oct. 24, 2000; U.S. Pat. No. 6,029,544, issued to Katayama on Feb. 29, 2000; U.S. Pat. No. 5,979,571, issued to Scott et al. on Nov. 9, 1999; U.S. Pat. No. 5,836,409, issued to Vail, III on Nov. 17, 1998; U.S. Pat. No. 4,241,483, issued to Voitas on Dec. 30, 1980; U.S. Pat. No. 4,200,159, issued to Peschel et al. on Apr. 29, 1980; and U.S. Pat. No. 4,169,637, issued to Voitas on Oct. 2, 1979.

The corresponding foreign and international patent publication applications, namely, Federal Republic of Germany-Patent Application No. 100 42 990.4, filed on Sep. 1, 2000, having inventors Bernhard BORSCHERT and Dieter MÜHLFRIEDEL, DE-OS 100 42 990.4 and DE-PS 100 42 990.4, and International Application No. PCT/EP01/09916, filed on Aug. 29, 2001, having WIPO Publication No. WO02/18082 A1 and inventors Bernhard BORSCHERT and Dieter MÜHLFHIEDEL, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Some examples of drills and/or drill bits with titanium carbide that may possibly be utilized or adapted for use in at least one possible embodiment of the present invention may possibly be found in the following U.S. patents: U.S. Pat. No. 5,882,152, issued to Janitzki on Mar. 16, 1999 and U.S. Pat. No. 4,211,294, issued to Multakh on Jul. 8, 1980.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The details in the patents, patent applications and publications may be considered to be incorporable, at applicant's option, into the claims during prosecution as further limitations in the claims to patentably distinguish any amended claims from any applied prior art.

Some examples of high strength steel that may possibly be utilized or adapted for use in at least one possible embodiment of the present invention may possibly be found in the following U.S. patents: U.S. Pat. No. 4,578,113, issued to Rana et al. on Mar. 25, 1986; U.S. Pat. No. 4,720,307, issued to Matsumoto et al. on Jan. 19, 1988; U.S. Pat. No. 4,814,141, issued to Imai et al. on Mar. 21, 1989; U.S. Pat. No. 4,826,543, issued to Yano et al. on May 2, 1989; U.S. Pat. No. 4,956,025, issued to Koyama et al. on Sep. 11, 1990; U.S. Pat. No. 5,651,938, issued to Thomson et al. on Jul. 29, 1997; U.S. Pat. No. 5,772,957, issued to Thomson et al. on Jun. 30, 1998; and U.S. Pat. No. 5,798,004, issued to Tamehiro et al. on Aug. 25, 1998.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, the abstract is not intended to limit the claims in any manner and should not be interpreted as limiting the claims in any manner.

The invention as described hereinabove in the context of the preferred embodiments is not to be taken as limited to all of the provided details thereof, since modifications and variations thereof may be made without departing from the spirit and scope of the invention.

AT LEAST PARTIAL NOMENCLATURE

1 Tool head
2 Tool shank
3 Cutting edge
4 Tip
5 Base body
6 Longitudinal axis
7 Fixing peg
8 Truncated cone
9 Spiral flute, chip flute
10 Truncated cone generated surface
11 Truncated cone generated surface
12 Chucking end
13 Clamping extension
14 Clamping extension
15 Inner flank
16 Inner flank
17 Insertion direction
18 Diameter
19 Axial stop
20 End surface
21 Driver surface
22 Driver surface
23 Tapered end of the fixing peg
24 Driver pegs
25 Central recess
26 Clamp fixing screw
27 Passage hole
28 Slot
29 Snap lugs
30 Recess
31 Mating surface

What is claimed is:

1. A rotary cutting tool comprising:
a) a shaft having a central longitudinal axis, a first end and an opposing second end, wherein the first end is adapted to be inserted into and held by a toolholder and wherein the second end has two flexible extending portions disposed opposite one another, extending substantially along the longitudinal axis, and defining shaft slots therebetween;
b) a receptacle structure defined by the two extending portions and a bottom wall disposed between and wherein the interior surfaces of the extending portions define a conical shape;
c) a replaceable cutting insert adapted to be removably attached to the second end of the shaft, wherein the cutting insert comprises a cutting tip with at least one cutting edge configured to cut an object, a body portion and a fixing peg extending therefrom adapted to be removably received within the receptacle structure, wherein at least a portion of the fixing peg has a conical shape matable with the interior surfaces of the extending portions of the receptacle structure through a resilient friction fit; and
(d) at least one protrusion and at least one matching recess, each located in one of either the extending portions or the fixing peg, wherein the protrusion/recess combination provides a detachable snap connection between the receptacle portion and the fixing peg,
wherein a portion of the fixing peg has a non-conical surface suitable to engage a matching non-conical surface within the receptacle structure to non-rotatably secure the insert within the shaft.

2. A rotary cutting tool comprising:
a) a shaft having a central longitudinal axis, a first end and an opposing second end, wherein the first end is adapted to be inserted into and held by a toolholder and wherein the second end has two flexible extending portions disposed opposite one another, extending substantially along the longitudinal axis, and defining shaft slots therebetween;
b) a receptacle structure defined by the two extending portions and a bottom wall disposed between and wherein the interior surfaces of the extending portions define a conical shape; and
c) a replaceable cutting insert adapted to be removably attached to the second end of the shaft, wherein the cutting insert comprises a cutting tip with at least one cutting edge configured to cut an object, a body portion and a fixing peg extending therefrom adapted to be removably received within the receptacle structure, a bearing surface disposed between the body portion and the fixing peg adapted to contact and rest against an end face on each of the extending portions to locate the insert within the shaft, wherein at least a portion of the fixing peg has a conical shape matable with the interior surfaces of the extending portions of the receptacle structure through a resilient friction fit,
wherein a portion of the fixing peg has a non-conical surface suitable to engage a matching non-conical surface within the receptacle structure to non-rotatably secure the insert within the shaft.

3. The cutting tool according to claim 2, further including at least one chip flute that is oriented essentially axially and extends in the axial direction from the cutting insert along the shaft, wherein when the cutting insert is in the fixed position, the chip flute runs in the space between the two extending portions.

4. The cutting tool according to claim 2, wherein the cutting insert is one from the group of cutting tools consisting of a drill, milling cutter, or reamer.

5. A rotary cutting tool comprising:
a) a shaft having a central longitudinal axis, a first end and an opposing second end, wherein the first end is adapted to be inserted into and held by a toolholder and wherein the second end has a bore extending therein substantially along the longitudinal axis, wherein the bore defines walls thereabout;
b) a receptacle structure defined by the interior surfaces of the walls, wherein the interior surfaces define a conical shape; and
c) a replaceable cutting insert adapted to be removably attached to the second end of the shaft, wherein the cutting insert comprises a cutting tip with at least one cutting edge configured to cut an object, a body portion and a fixing peg extending therefrom adapted to be removably received within the receptacle structure, a bearing surface disposed between the body portion and the fixing peg adapted to contact and rest against an end face on each of the extending portions to locate the tool within the toolholder, wherein at least a portion of the fixing peg has a conical shape matable with the interior surfaces of the receptacle structure through a resilient friction fit, wherein a portion of the fixing peg has a non-conical surface suitable to engage a matching non-conical surface within the receptacle structure to non-rotatably secure the insert within the shaft.

6. A rotary cutting tool comprising:

a) a shaft having a central longitudinal axis, a first end and an opposing second end, wherein the first end is adapted to be inserted into and held by a toolholder and wherein the second end has a bore extending therein substantially along the longitudinal axis, wherein the bore defines walls thereabout;

b) a receptacle structure defined by the interior surfaces of the walls, wherein the interior surfaces define a conical shape;

c) a replaceable cutting insert adapted to be removably attached to the second end of the shaft, wherein the cutting insert comprises a cutting tip with at least one cutting edge configured to cut an object, a body portion and a fixing peg extending therefrom adapted to be removably received within the receptacle structure, wherein at least a portion of the fixing peg has a conical shape matable with the interior surfaces of the receptacle structure through a resilient friction fit; and (d) at least one protrusion and at least one matching recess, each located in one of the extending portions and the fixing peg, wherein the protrusion/recess combination provides a detachable snap connection between the receptacle portion and the fixing peg, wherein a portion of the fixing peg has a non-conical surface suitable to engage a matching non-conical surface within the receptacle structure to non-rotatably secure the insert within the shaft.

7. The cutting tool according to claim 5, further including at least one chip flute that is oriented essentially axially and extends in the axial direction from the cutting insert along the tool shank, wherein when the cutting insert is in the fixed position, the chip flute runs in the space between the two extending portions.

8. The cutting tool according to claim 5, wherein the cutting tool is one from the group of cutting tools consisting of a drill, milling cutter, or reamer.

9. The cutting tool according to claim 6, further including at least one chip flute that is oriented essentially axially and extends in the axial direction from the cutting insert along the tool shank, wherein when the cutting insert is in the fixed position, the chip flute runs in the space between the two extending portions.

10. The cutting tool according to claim 6, wherein the cutting tool is one from the group of cutting tools consisting of a drill, milling cutter, or reamer.

11. The cutting tool according to claim 1, further including at least one chip flute that is oriented essentially axially and extends in the axial direction from the cutting insert along the shaft, wherein when the cutting insert is in the fixed position, the chip flute runs in the space between the two extending portions.

12. The cutting tool according to claim 1, wherein the cutting insert is one from the group of cutting tools consisting of a drill, milling cutter, or reamer.

* * * * *